(12) United States Patent
Kokkinos

(10) Patent No.: US 7,526,154 B2
(45) Date of Patent: Apr. 28, 2009

(54) COVER FOR OPTICAL FIBERS AND/OR OPTICAL DEVICES

(75) Inventor: Dimitrios Kokkinos, Flushing, NY (US)

(73) Assignee: Verizon Services Corp., Arlington, VA (US)

( * ) Notice: Subject to any disclaimer, the term of this patent is extended or adjusted under 35 U.S.C. 154(b) by 148 days.

(21) Appl. No.: 11/453,876

(22) Filed: Jun. 16, 2006

(65) Prior Publication Data

US 2007/0292098 A1    Dec. 20, 2007

(51) Int. Cl.
  *G02B 6/26* (2006.01)
  *G02B 6/42* (2006.01)
  *G02B 6/00* (2006.01)

(52) U.S. Cl. .................................... 385/19; 385/138

(58) Field of Classification Search ................ 385/19, 385/138
  See application file for complete search history.

(56) References Cited

U.S. PATENT DOCUMENTS

| | | | | |
|---|---|---|---|---|
| 4,119,363 A * | 10/1978 | Camlibel et al. | ............. | 385/84 |
| 4,556,280 A * | 12/1985 | Bagby | ......................... | 385/19 |
| 5,485,538 A * | 1/1996 | Bowen et al. | ................. | 385/92 |
| 5,487,124 A * | 1/1996 | Bowen et al. | ................. | 385/93 |
| 5,841,562 A * | 11/1998 | Rangwala et al. | ........... | 398/139 |
| 5,956,444 A * | 9/1999 | Duda et al. | .................... | 385/53 |
| 6,075,635 A * | 6/2000 | Butrie et al. | ................ | 398/139 |
| 6,297,896 B1 * | 10/2001 | Kikuchi et al. | ................. | 398/9 |
| 6,430,331 B1 * | 8/2002 | Hagelin et al. | ................ | 385/17 |

* cited by examiner

*Primary Examiner*—Frank G Font
*Assistant Examiner*—Mary A El Shammaa

(57) ABSTRACT

Apparatus and methods are provided for controlling a light emission from an end of an optical fiber by utilizing a cover that blocks the light emission at the fiber end, a detector situated between the fiber end and the cover that detects the blocked emission, and a signaling device, such as an LED, associated with the detector that illuminates in response to the detection of the blocked emission. The apparatus and methods may further provide for the filtering out of light from the emission that is not used for communications. The apparatus and methods may also provide for the attenuation of the power of the emission before the emission reaches the detector.

23 Claims, 6 Drawing Sheets

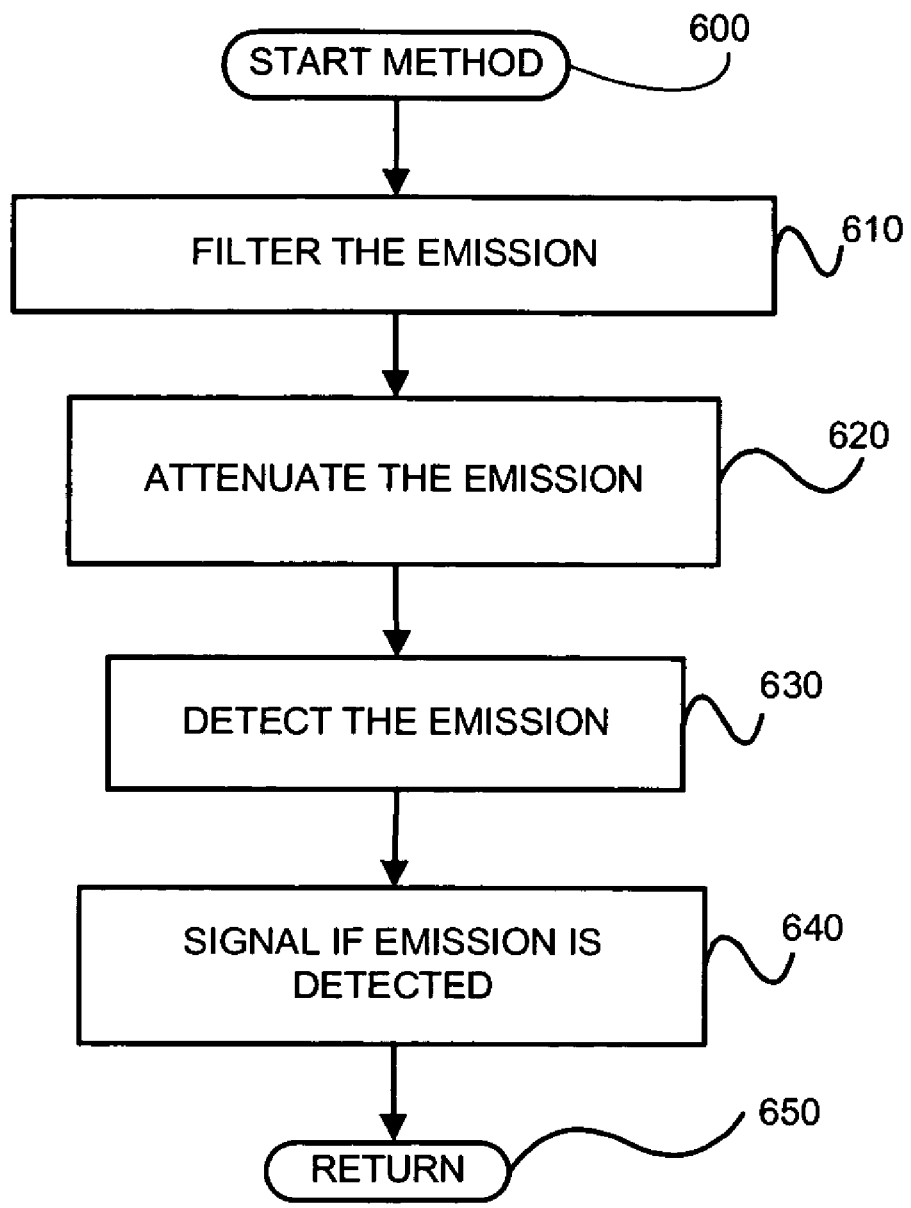

COVER FOR OPTICAL FIBERS AND/OR OPTICAL DEVICES

FIELD OF INVENTION

The present invention relates generally to apparatus and methods for controlling the light emissions from an end of an optical fiber.

BACKGROUND

Optical fibers are used for transmitting electronic signals in high-speed data and communications systems. A standard optical fiber contains an inner light transmitting optical core. Surrounding each fiber is an outer protective casing. Optical fibers are utilized in the telecommunications industry, as well as other industries, as a preferred transmission medium because of their ability to carry large amounts of data at high speeds, over long distances.

Optical fibers are often terminated in connectors, so that they can be connected to other fibers or some other device. The "slot" that holds the fiber in position within the connector assembly is known as a ferrule. The precise positioning of the fiber in ferrules is necessary in order to consistently align one end of a fiber with the end of another fiber in a mating connector assembly, or with a device connected to the other end of the connector.

In the telecommunications industry, multiple fibers terminating at the back of a Fiber Distribution Frame (FDF) are connected via fibers within the frame to "ports" on the front side of the frame. These ports have rigid sleeves to hold the connectors in place, and apertures for the ferrules. In this way, the ports can be used to connect other optical fibers or electronic equipment plugged into the ports on the front of the frame to the fibers terminating on the back side of the frame.

If a port on the front side of an FDF is connected through the frame to the back side, and there is no equipment plugged into the port, there would be a fiber "end" exposed at the port. Further, if there is a "live" (powered) fiber connected to the back side of the FDF and associated with that port, the fiber end at the port would be emitting potentially dangerous light. The power level for some current systems with optical amplifiers is approaching 400 mW. For "next generation" systems it is expected to approach 1 W. At these power levels, the emissions could injure the eyes of a person looking at the port.

In order to avoid physical damage to the fiber end at an exposed port, and to avoid possible damage to the eyes of anyone looking at the ports, "dust covers" have been placed over the sleeves to protect both the fiber and the connectors from harmful dust or debris, as well as blocking any laser light emitted from the exposed fiber end. Covers could also be utilized in situations other than an FDF, such as to cover fiber connectors, or to cover fiber ferrules.

In the case of covers over sleeves on FDFs, these covers are routinely removed for long periods of time while service personnel are working on the front of the frame, looking at the ports. If a live optical fiber is connected at the back of the frame, and the port is not immediately tested when the cover is removed, the technician could be injured by the emitted light. Further, if the port is "live" for an extended period of time, the plastic cover could be damaged due to opto-thermal effects of the emitted light.

It would therefore be advantageous for service personnel to know whether a port is "live" before removing a cover from the port. It would also be advantageous to know if an installed cover is covering a live port, so that such a situation could be addressed before damage is done to the cover, or for other operational reasons. For instance, it may very well be a mistake that a "covered" port is live. Therefore, if there were an indication of this situation on a covered port, the problem could be resolved.

It would be further advantageous if the power level of light emitted from an optical fiber under a cover could be reduced while the cover is in place, in order to avoid damage to the cover.

It would be further advantageous if there was an indication that light within the spectrum used for communications was present under the cover, as opposed to extraneous light that would not be potentially harmful.

BRIEF DESCRIPTION OF FIGURES

FIG. 6 is a flowchart of an exemplary method of indicating that an optical fiber under a cover is powered in accordance with the present invention.

DETAILED DESCRIPTION

Figure 1:
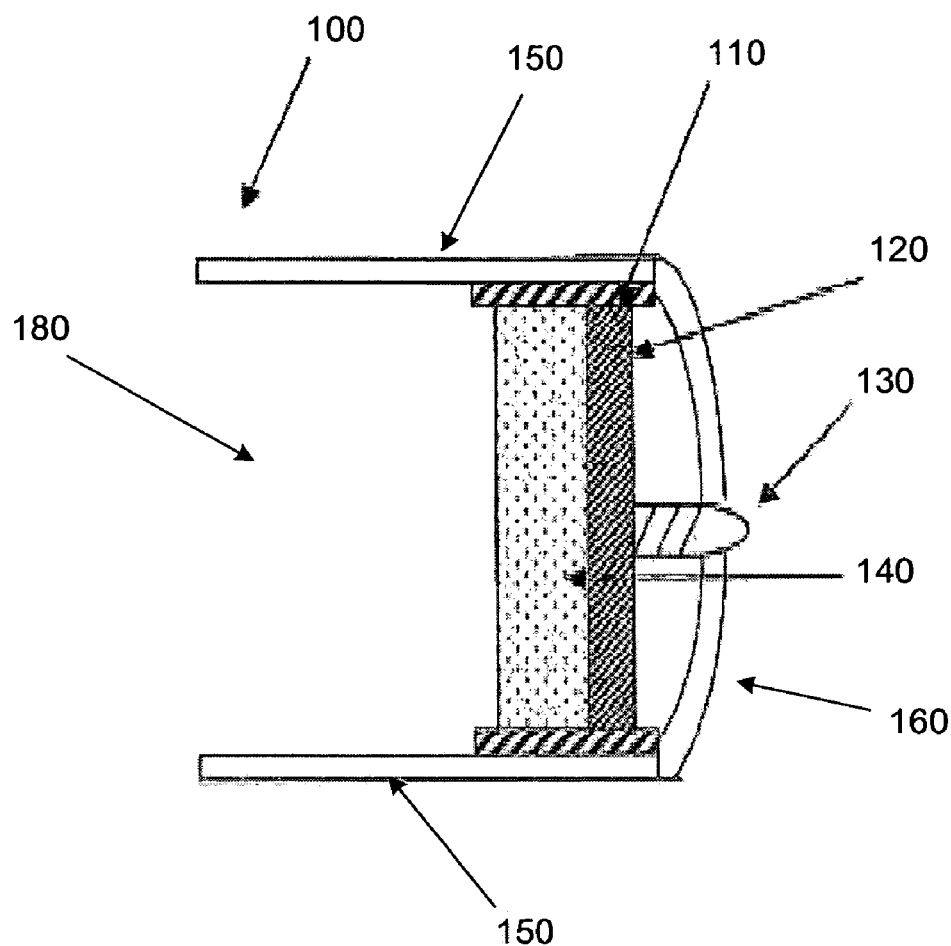
FIG. 1 is a drawing of an exemplary apparatus implemented in accordance with the present invention and using methods of the present invention.

FIG. 1 is a drawing of an exemplary cover 100 implemented in accordance with the present invention and using methods of the present invention. Cover 100 is a cylindrical structure, preferably plastic, and hollow at one end (opening 180). Cover sidewall 150 and cover end 160 would be used to cover the end of an optical fiber, or alternatively to cover a connector coupler containing an optical fiber (not shown). Cover 100 could be considered to be a cap or hood to be placed over the fiber end. Cover end 160 would be preferably composed of an opaque material that would block the light emitted from the end of the optical fiber.

Support ring 110 is a rigid ring member which holds coating 140, photo detector 120, and LED (Light Emitting Diode) 130 in place. Coating 140 may be made up of a material that would filter out a portion of the light spectrum emitted from the optical fiber end in opening 180. For instance, coating 140 could be designed to filter out the portion of the light spectrum that doesn't carry communications. As will be seen more clearly below, this could be used to prevent false indications of harmful emissions from the optical fiber. Alternatively, the designated spectrum to be filtered out could be light that would not be harmful to the human eye. This would prevent the LED from illuminating if none of the detected light would be harmful to the eye. The material of coating 140 could be self-supporting within ring 110, or could be applied to the surface of photo-detector 120.

Alternatively, or additionally, coating 140 may be a material which attenuates the power of the laser light emission passing through it. If the power of the laser beam is such that it could damage cover end 160, this attenuating layer of coating 140 could reduce the power to a safe level whenever cover 100 is in place over the fiber end. Again, this attenuating material could either be self-supporting within ring 110, or could be a coating on photo detector 120. Coating 140 could be designed for various power level applications.

Alternatively, coating 140 could contain a combination of attenuating material and filter material, to simultaneously filter out light of a designated portion of the spectrum and reduce the power level of the remaining light.

LED 130 is affixed to photo-detector 120. This combination of photo detector 120 and LED 130 would transform light emitted from the fiber end through the attenuator/filter of coating 140 to electrical energy, which would illuminate LED 130 with light that could be seen by the naked eye. LED 130 could protrude through an aperture in cover end 160, so that someone looking at cover 100 would be able to see whether LED 130 was illuminated or not. If LED 130 was illuminated, the observer would know that the optical fiber within opening 180 was "live"; i.e., was carrying a light signal. However, as opposed to the light emitted from the optical fiber being dangerous to a technician's eyes, the light from the LED would be safe. This would allow the technician to take further precautions before removing cover 100 from the optical fiber (or the connector coupler encasing the end of the optical fiber).

Figure 2:
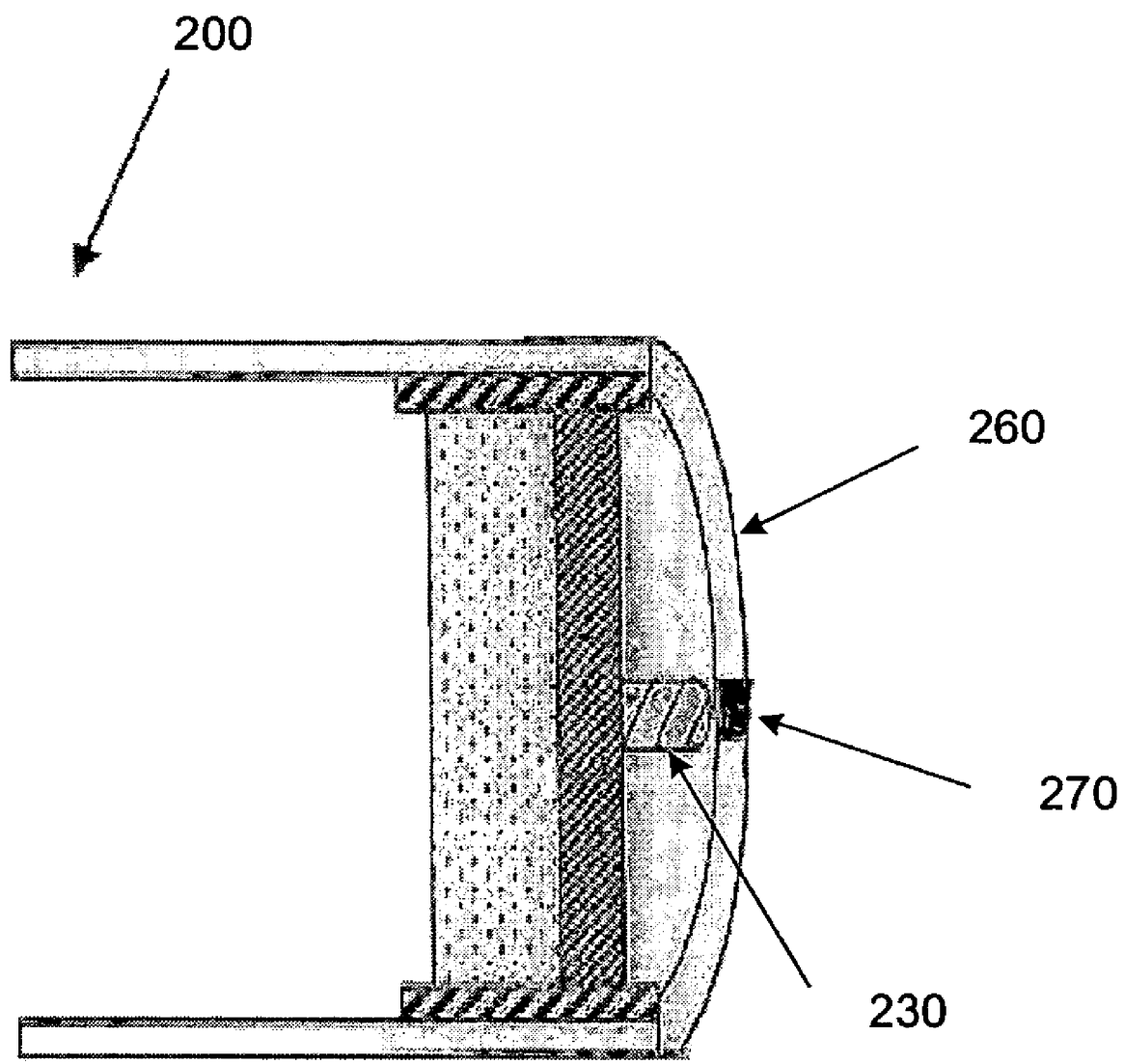
FIG. 2 is a drawing of an exemplary apparatus implemented in accordance with the present invention and using methods of the present invention.

Alternatively, as shown in FIG. 2, instead of protruding through a hole in cover end 260 of cover 200, LED 230 could be situated underneath cover end 260, and a portion 270 of cover end 260 over LED 230 could be made of a translucent or transparent material, which would allow a technician to see LED 230 illuminated beneath the surface of cover end 260. Translucent portion 270 could be sized and situated such that no harmful light from the optical fiber would pass through it.

Returning to FIG. 1, cover sidewall 150 could be of a "neutral" color, such as green or yellow, whereas cover end 160 could be a bright red, signifying that the cap is non-standard; that the connector underneath cover 100 could be a live unterminated connector or link, and could contain an active, high-powered laser beam; and that the technician should look at LED 130 before removing cover 100. This could avoid exposure by the technician to invisible radiation and indicate that proper action must be taken to deactivate or terminate the link.

Cover 100 is a cover or housing that could be manufactured with the fiber or connector, and would be removable. Alternatively, cover 100 could be a stand-alone cover, including the associated support ring 110, coating 140, photo-detector 120, and LED 130, which could be placed over the end of an optical fiber or connector in the field.

Another variation consistent with the present invention would be to install a support ring 110, coating 140, photo-detector 120, and LED 130 into an existing dust cover in the field, and punching a hole in the end of the dust cover for the LED to protrude therethrough. Cover 100 could be placed over the end of an optical fiber in the field, or could be placed over a fiber/connector combination on a Fiber Distribution Frame, or similar situation.

Figure 3:
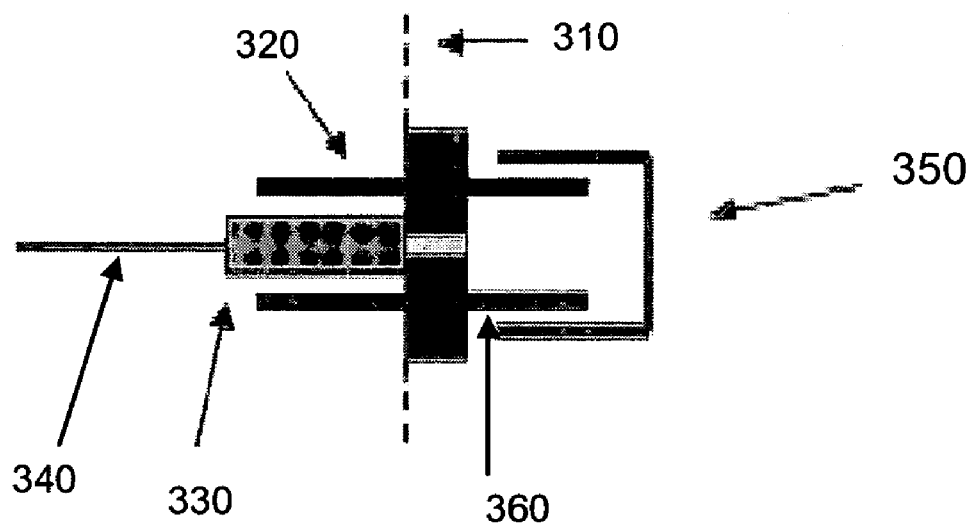
FIG. 3 is a drawing of an exemplary apparatus implemented in accordance with the present invention and using methods of the present invention on a fiber frame.

FIG. 3 shows the side view of a port on a fiber distribution frame. The port includes sleeve 320, which holds connector 330 of fiber 340 in place, and sleeve 360, which is available to hold a connector in place that is to be plugged into the port. An embodiment of the present invention, cover 350, is shown placed over sleeve 360, which would protect sleeve 360 and fiber 340 from dust and debris, and would indicate through an LED (not shown) whether fiber 340 was powered with potentially dangerous light.

Figure 4:
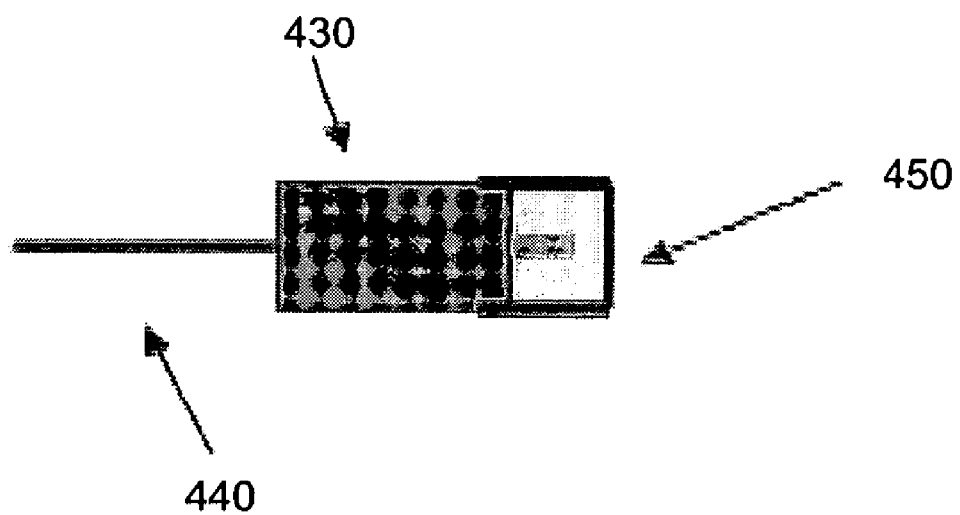
FIG. 4 is a drawing of an exemplary apparatus implemented in accordance with the present invention and using methods of the present invention on a fiber connector.

FIG. 4 shows an embodiment of the present invention wherein the inventive cover 450 is placed over connector 430, which holds fiber 440. In this case, connector cover 450 would not only protect connector 430 and fiber 440, but would indicate whether fiber 440 was powered with potentially dangerous laser light.

Figure 5:
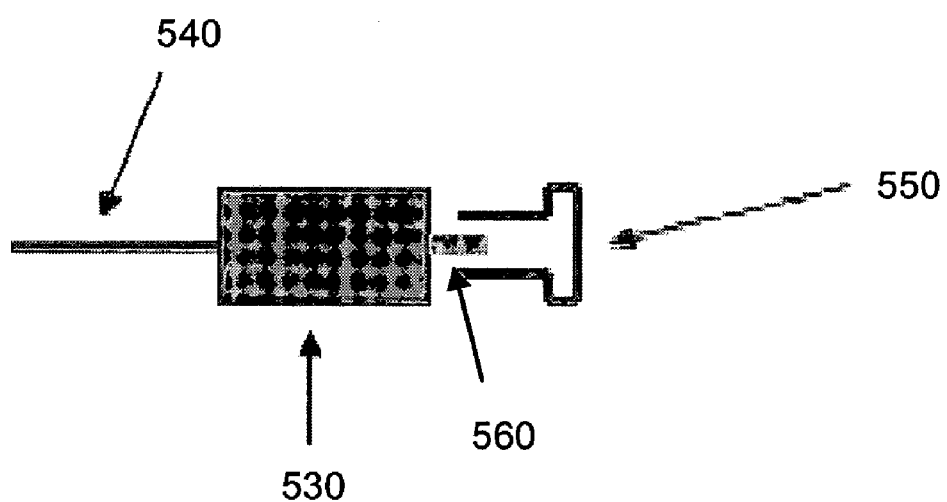
FIG. 5 is a drawing of an exemplary apparatus implemented in accordance with the present invention and using methods of the present invention on a fiber ferrule.

FIG. 5 shows another embodiment of the present invention wherein the inventive cover 550 is placed over ferrule 560, which is encased in connector 530, and holds fiber 540 in place. In this case, cover 550 would not only protect ferrule 560, and fiber 540, but would indicate whether fiber 540 was powered with potentially dangerous light.

FIG. 6 shows the steps that could be taken to implement an embodiment of the present invention. The first step 610 is to filter the emission, to only allow communications-carrying portions of the laser spectrum to pass through. Step 620 (which could also be accomplished with or before step 610) is to attenuate the power of the laser beam before it is detected. It should be understood that both steps 610 and 620 are optional steps, and the invention would be effective without either. Step 630 would be to detect the filtered, attenuated emission from the optical fiber. Finally, step 640 would be to signal, such as with a light, if an emission has been detected at step 630.

The methods and apparatus of the invention can be applied to and/or used with, a wide range of devices. Applications of this invention, in addition to FDFs, include optical devices and subsystems terminated with optical connectors such as optical sources, optical amplifiers, Optical Add Drop Multiplexers (OADM) in Dense Wavelength Division Multiplexing systems. The invention is particularly useful in cases where the devices and/or systems use dangerously high optical power.

Numerous additional variations on the methods and apparatus of the present invention described above will be apparent to those skilled in the art in view of the above description of the invention. Such variations are to be considered within the scope of the invention.

What is claimed is:

1. An apparatus comprising:
   a cover that blocks a first light emission from an end of an optical fiber when placed over the optical fiber end,
   a detector situated between the fiber end and the cover to detect the first light emission before it is blocked, and
   a signaling device associated with the detector that signals detection of the first light emission when said first light emission is received by said detector.

2. The apparatus of claim 1, wherein the signal from the signaling device is a second light emission.

3. The apparatus of claim 2, wherein the second light emission is visible to the naked eye.

4. The apparatus of claim 1, wherein the detector is a photo-detector.

5. The apparatus of claim 1, wherein the signaling device is an LED.

6. The apparatus of claim 1, further comprising:
   a filter situated between the fiber end and the detector.

7. The apparatus of claim 1, further comprising:
   an attenuator situated between the fiber end and the detector.

8. The apparatus of claim 5, wherein the LED protrudes through an aperture in the cover.

9. The apparatus of claim 5, wherein the LED is situated between the fiber end and the cover.

10. The apparatus of claim 7, wherein the attenuator reduces the power of the first emission.

11. The apparatus of claim 6, wherein the filter eliminates light in the first emission that is not within a designated spectrum.

12. A device, the device comprising:
   a cover for blocking a first light emission from an end of an optical fiber when placed over the end of the fiber,
   a photo-detector situated between the fiber end and the cover that detects the blocked first emission, and
   an LED associated with the detector that illuminates in response to detection of the blocked first emission.

13. The device of claim 12 further comprising an attenuator situated between the fiber end and the detector that reduces the power of the first emission.

14. The device of claim 12, further comprising a filter situated between the fiber end and the detector that filters out the portion of the first emission that isn't within a designated spectrum.

15. A method, the method comprising:
   blocking a first light emission from an end of an optical fiber by placing a cover over the end of the fiber,
   detecting between the end of the fiber and the cover the presence of the blocked first light emission, and
   signaling in response to the detection of the blocked first emission.

16. The method of claim 15, wherein said signaling includes generating a second light emission visible to the naked eye, said second light emission having an intensity lower than the first light emission.

17. The method of claim 15, wherein the signaling is accomplished by using an LED.

18. The method of claim 15, further comprising attenuating the power of the first emission before it is detected.

19. The method of claim 15, further comprising filtering out a portion of the first emission, before detecting the first emission.

20. A hood for an optical fiber, comprising:
   a cover for blocking light emitted from the fiber end,
   a photo-detector situated between the fiber end and the cover that detects the blocked first emission, and
   a signaling device for signaling in response to detection of the blocked first emission.

21. The hood of claim 20 wherein the signaling device is an LED.

22. The hood of claim 20 further comprising means for attenuating the power of the first emission before it is detected.

23. The hood of claim 20, further comprising means for filtering out a portion of the first emission before it is detected.

* * * * *